US008472875B2

(12) United States Patent
Ji et al.

(10) Patent No.: US 8,472,875 B2
(45) Date of Patent: Jun. 25, 2013

(54) WIRELESS MOBILE COMMUNICATION SYSTEM FOR VEHICLE AND METHOD OF USE

(75) Inventors: Sang Woo Ji, Seoul (KR); Hyeon Soo Kim, Gyeonggi-do (KR); Jae Hun Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 429 days.

(21) Appl. No.: 12/510,313

(22) Filed: Jul. 28, 2009

(65) Prior Publication Data

US 2010/0075608 A1    Mar. 25, 2010

(30) Foreign Application Priority Data

Sep. 22, 2008 (KR) .................. 10-2008-0092726

(51) Int. Cl.
*H04B 7/00* (2006.01)
(52) U.S. Cl.
USPC ............. 455/41.2; 455/569.2; 455/575.9; 340/438; 340/425.5
(58) Field of Classification Search
USPC ............ 455/66.1, 569.2, 41.2, 456.1, 575.9, 455/99, 152.1, 557; 342/69, 357.2; 340/426.2, 340/438, 425.5, 426.1, 426.18, 426.19, 426.21, 340/991, 993; 701/400; 348/148
See application file for complete search history.

(56) References Cited

U.S. PATENT DOCUMENTS

| 6,954,153 | B2* | 10/2005 | Choi ..................... 340/995.12 |
| 7,181,343 | B2* | 2/2007 | Mukaiyama ............... 701/200 |
| 7,778,213 | B2* | 8/2010 | Alrabady et al. ........... 370/312 |
| 7,822,384 | B2* | 10/2010 | Anschutz et al. .......... 455/41.2 |
| 2003/0163233 | A1* | 8/2003 | Song et al. ................ 701/33 |
| 2004/0064337 | A1* | 4/2004 | Nakahara et al. ........... 705/1 |
| 2005/0009575 | A1* | 1/2005 | Ohta et al. ............... 455/569.2 |
| 2005/0119002 | A1* | 6/2005 | Bauchot et al. ............ 455/441 |
| 2005/0119030 | A1* | 6/2005 | Bauchot et al. ............ 455/564 |
| 2005/0132024 | A1* | 6/2005 | Habaguchi et al. ......... 709/219 |
| 2005/0137797 | A1* | 6/2005 | Oesterling et al. .......... 701/213 |
| 2005/0156718 | A1* | 7/2005 | Flick ..................... 340/426.19 |
| 2005/0203682 | A1* | 9/2005 | Omino et al. ............. 701/24 |
| 2006/0055521 | A1* | 3/2006 | Blanco et al. ............. 340/441 |
| 2006/0293040 | A1* | 12/2006 | Kortge ................... 455/418 |
| 2007/0135980 | A1* | 6/2007 | Plante ..................... 701/35 |
| 2007/0136078 | A1* | 6/2007 | Plante ..................... 705/1 |
| 2007/0179689 | A1* | 8/2007 | Soulie et al. .............. 701/19 |

(Continued)

FOREIGN PATENT DOCUMENTS

| JP | 2005-012563 A | 1/2005 |
| JP | 2006-129115 A | 5/2006 |

(Continued)

*Primary Examiner* — Dominic E Rego
(74) *Attorney, Agent, or Firm* — Edwards Wildman Palmer LLP; Peter F. Corless

(57) ABSTRACT

The present invention relates to technology which performs wireless communications of a vehicle by selectively operating a wireless communications module of a vehicle connected to an AP (Access Point) which collects vehicle information according to the state of the vehicle. The present invention includes a vehicle information storage unit that stores vehicle information collected from each electronic control unit of a vehicle; a wireless communications module that performs wireless communications with an AP (Access Point); and a wireless communications controller that controls a connection state of the AP with the wireless communications module by selectively operating the wireless communications module according to the state of the vehicle, and sends the vehicle information to the AP through the wireless communications module.

17 Claims, 6 Drawing Sheets

U.S. PATENT DOCUMENTS

| | | | |
|---|---|---|---|
| 2007/0185626 A1* | 8/2007 | Kaneko | 701/2 |
| 2008/0057865 A1 | 3/2008 | Bennett | |
| 2008/0200209 A1* | 8/2008 | Cahoon | 455/557 |
| 2009/0319095 A1* | 12/2009 | Cech et al. | 701/1 |
| 2010/0088181 A1* | 4/2010 | Crolley et al. | 705/14.63 |
| 2010/0127843 A1* | 5/2010 | Koenig | 340/439 |
| 2010/0318286 A1* | 12/2010 | Lorkowski et al. | 701/119 |

FOREIGN PATENT DOCUMENTS

| | | |
|---|---|---|
| JP | 2006-262176 A | 9/2006 |
| KR | 10-2005-0060246 | 6/2005 |
| KR | 10-2007-0095654 | 10/2007 |
| KR | 2008-0051816 A | 6/2008 |
| KR | 10-2010-0005451 | 1/2010 |

* cited by examiner

WIRELESS MOBILE COMMUNICATION SYSTEM FOR VEHICLE AND METHOD OF USE

CROSS-REFERENCE TO RELATED APPLICATION

This application claims under 35 U.S.C. §119(a) the benefit of Korean Patent Application No. 10-2008-0092726, filed on Sep. 22, 2008, the entire contents of which are incorporated herein by reference.

BACKGROUND OF THE INVENTION

The present invention generally relates to a communications system for a vehicle and method thereof. In particular embodiments, the invention relates to technology for performing wireless communications in a vehicle by selectively operating a wireless communications module in a vehicle according to the state of the vehicle, where the wireless communications module is preferably connected to an AP (Access Point) which collects vehicle information.

Vehicle manufacturers collect vehicle information from a vehicle by using wireless communications, providing a vehicle management service that is managed from a remote site which manages the state of vehicles based on the collected vehicle information.

The vehicle management service sets up an AP (Access Point) for the wireless communications in a certain area. Typically, when a vehicle enters a communications coverage of an AP, a wireless connection is suitably established between the wireless communications module installed in the vehicle and the AP, so that the AP collects the vehicle information from the wireless communications module of the vehicle.

FIG. 1 shows an illustration of an exemplary AP installation for providing a vehicle management service.

In FIG. 1, AP 1, AP 2 and AP 3 are preferably installed around a traffic lane which passes through A→B→C→D, while communications coverage Z13, Z23, Z123 in which communications coverage Z1 of AP 1, communications coverage Z2 of AP 2, and communications coverage Z3 of AP 3 overlap each other.

In spot A, for example, a vehicle transmits the vehicle information to AP 1 while the wireless channel is suitably connected between the vehicle and AP 1. In spot B, for example, the wireless channel is suitably connected between the vehicle and one of AP 1 or AP 2 so that the vehicle transmits the vehicle information to a corresponding AP. In spot C, for example, the wireless connection is suitably established between the vehicle and one of AP 1, AP 2, or AP 3 so that the vehicle transmits the vehicle information to the corresponding AP. In spot D, for example the wireless channel is suitably connected between the vehicle and AP 3 so that the vehicle transmits the vehicle information to AP 3.

In this state, when the speed of the vehicle is not slow enough to secure a time to transmit the vehicle information to an AP and to receive a notice from the AP after the wireless channel is connected between the vehicle and the AP, the vehicle is unable to completely transmit the vehicle information to the AP while driving in a traffic lane and the wireless channel is connected between the vehicle and one of AP1, AP2, or AP3. Hence, the reliability of the vehicle information which is received by the corresponding AP side can be decreased. Further, the vehicle is unable to receive the notice from the AP in a stable manner.

In addition, in a coverage area (for example, the central area of a city) in which an AP is densely installed, whenever an AP is searched, the vehicle information is transmitted to an AP by repeatedly performing a setup procedure for establishing wireless connection with the AP. In this case, since the vehicle information has to be transmitted to the AP more frequently than necessary and the vehicle wireless communications module of the vehicle side has to be continuously or intermittently operated, an overload can be generated.

Moreover, in the case of entering an AP coverage area, when the vehicle wireless communications module of the vehicle side succeeds in authentication by the AP, the vehicle wireless communication module transmits the vehicle information collected from each electronic control module to an AP without the driver's approval for transmitting the vehicle information. However, the vehicle information collection process using wireless communication is performed without the approval of the driver.

The above information disclosed in this Background section is only for enhancement of understanding of the background of the invention and therefore it may contain information that does not form the prior art that is already known in this country to a person of ordinary skill in the art.

SUMMARY OF THE INVENTION

In one aspect, the present invention provides a system which is capable of increasing the reliability of vehicle information transmitted to an AP by operating a wireless communications module of a vehicle connected to an external AP which wirelessly collects vehicle information according to the state of the vehicle. In preferred embodiments, the present invention provides a system which is capable of safely protecting personal information by transmitting the vehicle information to an external AP after obtaining suitably approval from a driver when a vehicle equipped with a wireless communications module transmits the vehicle information to the external AP.

According to a preferred aspect of the present invention, a wireless telecommunications system for a vehicle preferably includes a vehicle information storage unit that suitably stores vehicle information collected from each electronic control unit of a vehicle; a wireless communications module that suitably performs wireless communications with an AP (Access Point); and a wireless communications controller that suitably controls a connection state of the wireless communications module with the AP by selectively operating the wireless communications module according to the state of a vehicle, and suitably sends the vehicle information to the AP through the wireless communications module.

In accordance with a preferred embodiment of the present invention, a wireless telecommunications system for a vehicle may preferably further include a communications record information storage unit in which a wireless communications record of the vehicle is suitably stored.

In accordance with another preferred embodiment of the present invention, the wireless communications controller may suitably request or inquire information of the wireless communications record when a speed of the vehicle is suitably lower than a given speed, and normally operates the wireless communications module if a given time suitably elapses after a final AP connection. Preferably, the wireless communications controller may suitably inquire information of the wireless communications record, and normally operates the wireless communications module, if a given time suitably elapses after the final AP connection. According to further preferred embodiments of the invention, the wireless communications controller may suitably send the vehicle information to the wireless communications module when sending of the vehicle information is suitably approved by a driver. Preferably, the wireless communications controller may suitably output a message which asks the driver suitable communications approval through a cluster. According to certain preferred embodiments, the wireless communications controller may output a message which asks the driver communications approval through a speaker. Preferably, the wireless communications controller may suitably receive a communications approval confirmation command from a cluster. Preferably, the wireless communications controller normally operates the wireless communications module even in cases when the vehicle speed suitably exceeds the given speed, or when malfunction information transmitted from a specific electronic control unit is included in the vehicle information. In certain embodiments, the wireless communications controller may suitably operate the wireless communications module by using battery power, when a power source for a vehicle is turned off before the communications of the wireless communications module with the AP is terminated.

According to another aspect of the present invention, a wireless communications method for a vehicle preferably includes, but is not limited only to the following steps of (a) collecting vehicle information from each electronic control unit of a vehicle; (b) connecting the wireless communications module with an AP by selectively operating the wireless communications module of a vehicle according to the state of the vehicle; and (c) sending the vehicle information to the AP through the wireless communications module.

In accordance with preferred embodiments of the present invention, step (b) may preferably include operating the wireless communications module when the vehicle speed is suitably lower than a given speed so that the wireless communications module communicates with the AP. Step (b) may preferably comprise operating the wireless communications module if the vehicle speed is suitably lower than a given speed while a given time elapses after a final AP connection of the vehicle so that the wireless communications module preferably communicates with the AP. In related embodiments, step of (b) preferably includes operating the wireless communications module if a given time suitably elapses after a final AP connection of the vehicle so that the wireless communications module preferably communicates with the AP. In other related embodiments, step (b) may preferably comprise operating the wireless communications module if malfunction information transmitted from a specific electronic control unit is suitably included in the vehicle information so that the wireless communications module preferably communicates with the AP. In still other related embodiments, step (c) further preferably comprises obtaining suitable approval for sending the vehicle information from the driver of a vehicle. In further preferred embodiments, step (c) further comprises preferably outputting a message which asks the driver for suitable approval for sending the vehicle information of the driver through, for example, a display or a speaker.

In accordance with another preferred embodiment of the present invention, a wireless telecommunications method for a vehicle further includes providing suitable battery power to the wireless communications module, for example, in case a power source for a vehicle is turned off while the wireless communications module of the vehicle communicates with the AP.

In accordance with another further embodiment of the present invention, a wireless telecommunications method for a vehicle further preferably includes transiting to a state where the wireless communications module cannot suitably communicate with an arbitrary AP, when communicating to the wireless communications module of the vehicle with the AP is suitably completed.

Preferably, according to the wireless telecommunications system for a vehicle and method, there can be an effect of increasing the reliability of vehicle information transmitted to an AP by enabling a vehicle equipped with a wireless communications module to suitably transmit the vehicle information while being connected to the AP only, when a stable wireless communications network is suitably guaranteed. According to preferred embodiments of a wireless telecommunications system for a vehicle and method, there can be a suitable effect of preventing an outflow of personal information by preferably transmitting the vehicle information to the AP after acquiring approval from a driver, even though the vehicle equipped with the wireless communications module is connected to the AP.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinafter by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE EMBODIMENTS

As described herein, the present invention includes a wireless telecommunications system for a vehicle, comprising a vehicle information storage unit, a wireless communications module, and a wireless communications controller that controls a connection state of the wireless communications module with the AP by selectively operating the wireless communications module according to the state of the vehicle, and sends the vehicle information to the AP through the wireless communications module.

In one embodiment, the vehicle information storage unit stores vehicle information collected from one or more electronic control units of a vehicle.

In still another embodiment, the wireless communications module performs a wireless communications with an AP (Access Point).

In another embodiment, the wireless communications controller controls a connection state of the wireless communications module with the AP by selectively operating the wireless communications module according to the state of the vehicle.

In another related embodiment, the wireless communications controller sends the vehicle information to the AP through the wireless communications module.

In other aspects, the invention also features a motor vehicle comprising the wireless telecommunications system for a vehicle as described herein.

In another aspect, the invention features a wireless communications method for vehicle, comprising the steps of (a) collecting vehicle information from one or more electronic control units of a vehicle, (b) connecting the wireless communications module with an AP by selectively operating the wireless communications module of the vehicle according to a state of the vehicle, and (c) sending the vehicle information to the AP through the wireless communications module.

Figure 1:
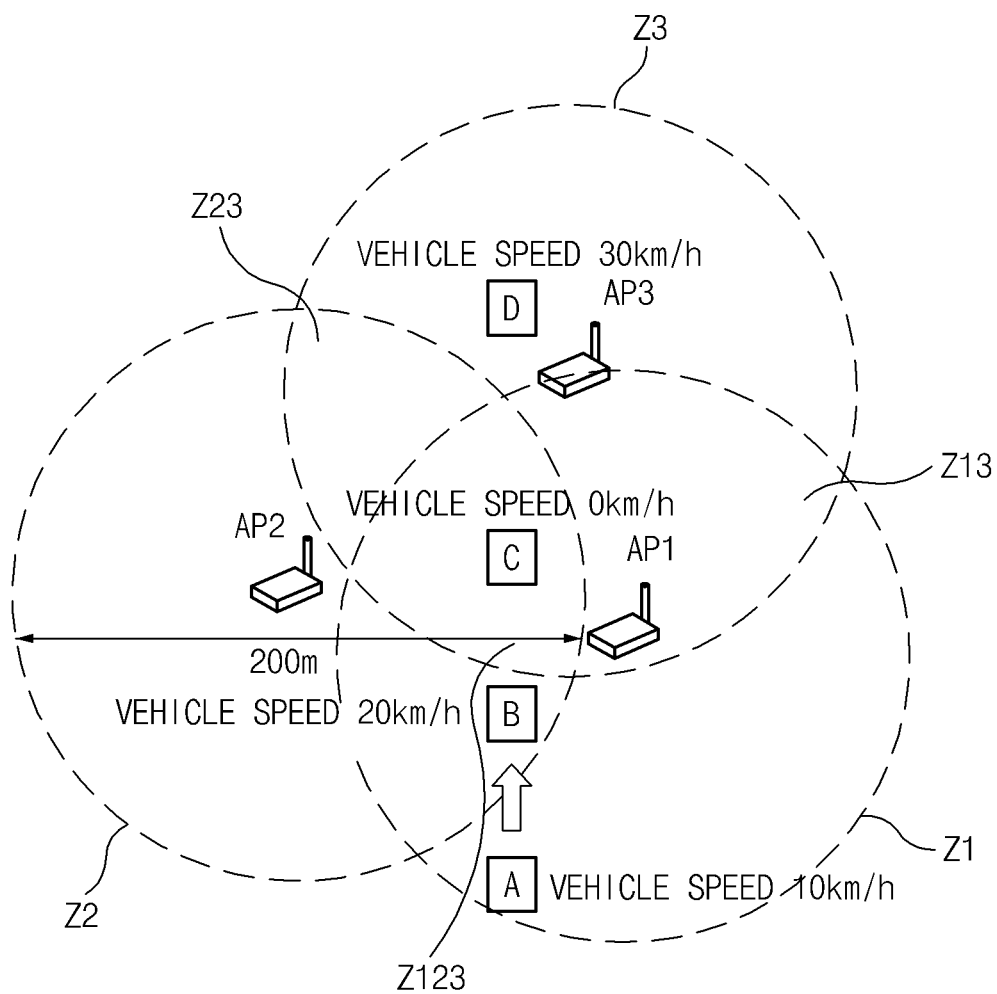
FIG. 1 shows an illustration of an exemplary AP installation for providing a vehicle management service.
Figure 2:
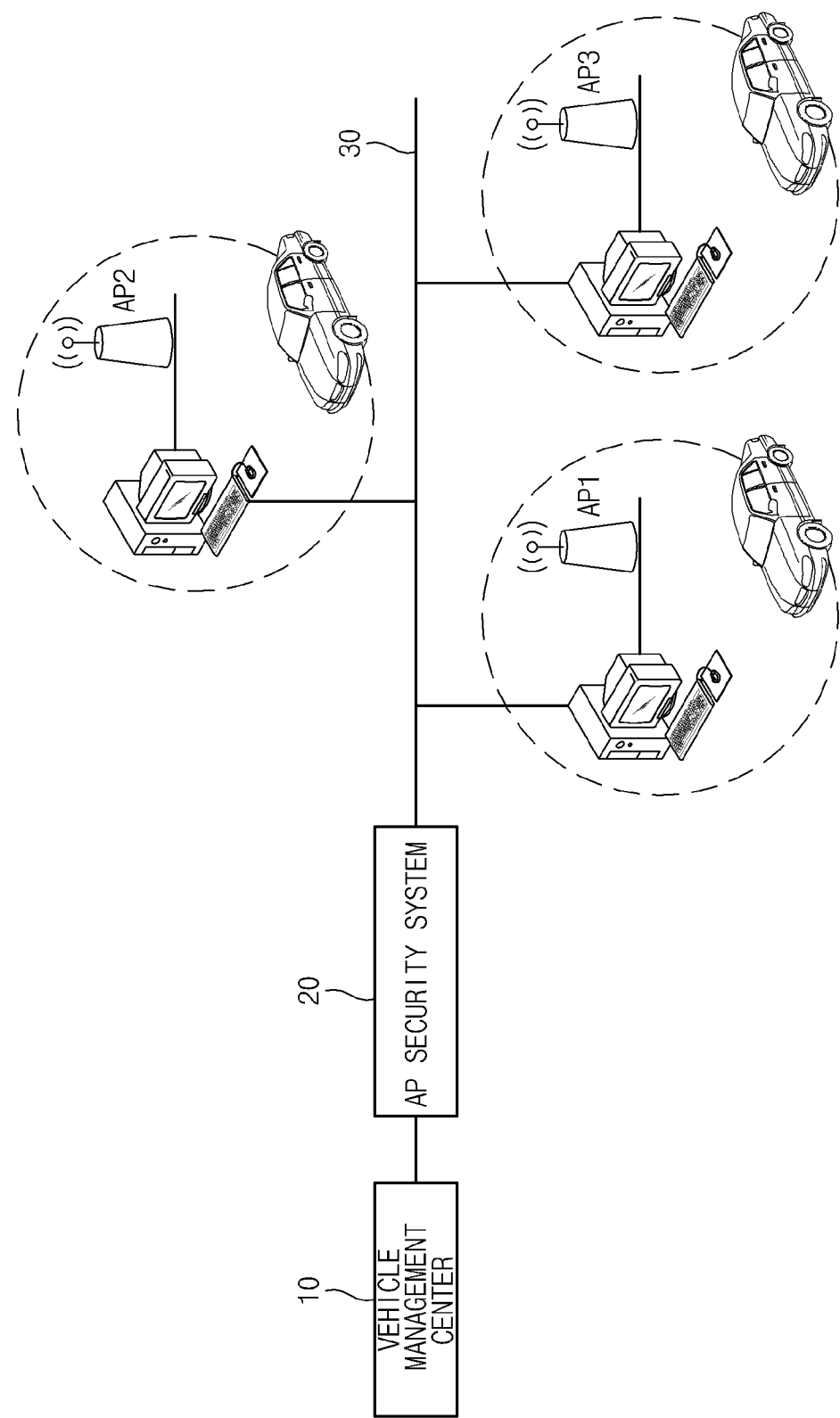
FIG. 2 is a configuration diagram of a vehicle management network to which a wireless telecommunications system for a vehicle is suitably applied according to an embodiment of the present invention.

Hereinafter, exemplary embodiments of the present invention will be described in detail with reference to the attached drawings FIG. 2 is an exemplary configuration diagram of a vehicle management network to which a wireless telecommunications system for a vehicle is suitably applied according to a preferred embodiment of the present invention.

In preferred embodiments, the vehicle management network preferably includes a vehicle management center 10 which suitably collects vehicle information from a vehicle and provides a vehicle management service based on the collected vehicle information, and APs (AP1~AP3) which suitably collect the vehicle information from an arbitrary vehicle with a wireless communications method while being suitably connected to the vehicle management center 10 with a wired LAN 30, and then suitably transmitting the collected vehicle information to the vehicle management center 10. Preferably, the APs (AP1~AP3) are located in a location that is outdoors, for example, but not limited to, a gas station, a traffic light, or a specified building.

According to preferred embodiments of the invention, the wired LAN 30 is suitably connected to the vehicle management center 10 through an AP security system 20 equipped with a firewall and an intrusion prevention system. In further embodiments, by periodically transmitting a suitable Inquiry Message, each AP is able to sense a vehicle which enters into its coverage area.

Preferably, the wireless communications method which can be suitably used between each AP and the vehicle includes, for example, Bluetooth, a wireless LAN (Wi-Fi), UWB (Ultra-Wideband) or ZigBee and other local area wireless technologies. In another preferred embodiment of the present invention, the wireless telecommunications system for a vehicle and each AP preferably make use of Bluetooth among the suitable communications methods.

Figure 3:
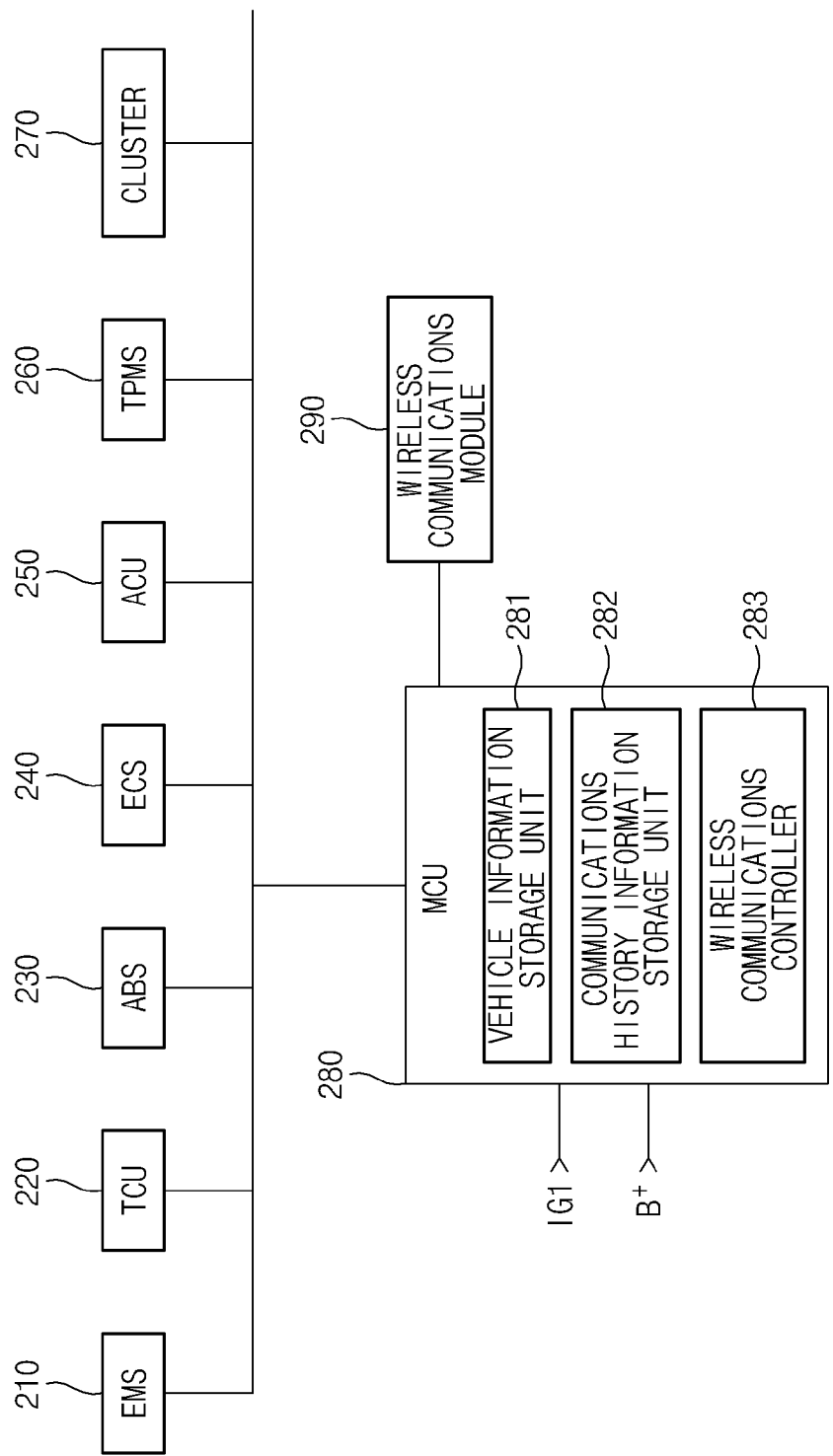
FIG. 3 is a block diagram of a wireless telecommunications system for a vehicle according to an embodiment of the present invention.

FIG. 3 is a block diagram of an exemplary wireless telecommunications system for a vehicle according to a preferred embodiment of the present invention.

The wireless telecommunications system for a vehicle according to an embodiment of the present invention preferably includes a wireless communications module 290 which suitably performs signal processing for performing wireless communications with an AP based on, for example, Bluetooth, various kinds of suitable electronic control units 210~270 equipped in the inside of the vehicle, and MCU (Microcontrol Unit) 280 which is a control unit that is preferably connected to the vehicle network, and which selectively activates the wireless communications module 290 and suitably controls the AP connection of the wireless communications module 290 according to the state of the vehicle preferably based on the vehicle information that is periodically collected from the electronic control units 210~270.

In preferred embodiments of the present invention, the MCU 280 suitably controls the wireless communications module 260 based on the vehicle speed and communications record of the vehicle, suitably performing the process of obtaining approval for the vehicle information being sent to a driver before transmitting the vehicle information to an AP.

According to preferred embodiments, the electronic control units 210~270 which are suitably connected to the MCU 280 preferably include, but are not limited only to, an EMS (Engine Management System) 210, a TCU (Transmission Control Unit) 220, an ABS (Anti-lock Brake System) 230, an ECS (Electronic Control Suspension) 240, an ACU (Airbag Control Unit) 250, a TPMS (Tire Pressure Monitoring System) 260, a cluster 270 or the like. In further embodiments, besides these units, other electronic control units are also suitably connectable.

Preferably, the EMS 210 provides various information relating to an engine to the MCU 280. In related embodiments, the information relating to the engine suitably includes, but is not limited to, engine RPM information, engine malfunction information, cooling water temperature information, exhaust gas normality information, and engine sensor malfunction information. Preferably, the TCU 220 provides various information relating to a transmission to the MCU 280. IN related embodiments, the various information relating to transmission suitably includes, but is not limited only to, drive rotary speed information, shiftgear information, clutch information, transmission oil temperature information, transmission malfunction information, and vehicle speed information.

In further embodiments of the invention, the ABS 230 preferably provides various information relating to the anti break system to the MCU 280. Preferably, the various information relating to the anti break system includes, but is not limited to, wheel speed information, brake operation information, and ABS error information. The ECS 240 provides information relating to the suspension to the MCU 280. Preferably, the various information relating to the suspension includes, but is not limited to, height information, attenuation information of a damper, and vehicle inclination information.

In other further embodiments of the invention, the ACU 250 provides various information relating to airbags to the MCU 280. Preferably, the various information relating to the airbag suitably includes, but is not limited to, airbag opening and closing information, and sensor malfunction information. Preferably, the TPMS 260 provides various information relating to the air pressure of the tires to the MCU 280. Preferably, the various information relating to the air pressure of the tires suitably includes, but is not limited to, air pressure information of tire, air temperature information of tire, and tire malfunction information.

In further embodiments of the invention, the cluster 270 provides various information on the driving status of a vehicle from the MCU 280, operating a lamp indicating a wireless communications connection under the suitable control of the MCU 280, and performing the function of outputting a message for acquiring the driver's approval for the wireless communications connection to a screen. Preferably, the various information on the driving status of a vehicle suitably includes, but is not limited to, vehicle driving distance information, driving time information, and cluster malfunction information.

In further embodiments of the invention, the vehicle information used in the present invention means all information which electronic control units 210~270 connected through the vehicle network transmit to the MCU 280. Preferably, the MCU 280 suitably includes, but is not limited to, a vehicle information storage unit 281, communications record information storage unit 282, and a wireless communications controller 283.

Preferably, the vehicle information storage unit 281 suitably stores vehicle information received from the electronic control units 210~270. In related embodiments, the communications record information storage unit 282 suitably stores communications record information on the wireless communications module 290 transmitting the vehicle information while being connected to each AP.

In other embodiments of the present invention, the wireless communications controller 283 preferably determines an AP connection condition by suitably using the communication history information, and drives the wireless communications module 290 in the case when the vehicle information suitably satisfies the AP connection condition, and performs the function of disabling the wireless communications module 290 based on the communications record information.

According to further particular embodiments, in the present invention, the wireless communications controller 283 preferably allows the wireless communications module 290 to suitably communicate with an AP only when the driving speed of a vehicle is lower than a specific speed by using the vehicle information.

Preferably, by using the communications record information, the wireless communications controller 283 suitably blocks the connection of the vehicle to the AP which is suitably identical with the AP that the vehicle first connected to, or the other AP within a suitably predetermined time from the final AP connection time so that the operation of the wireless communications module 290 is stabilized. According to further related embodiments, the wireless communications controller 283 suitably controls the wireless communications module 290 in such a manner that the wireless communications module 290 preferably communicates with the searched AP regardless of the communications record in the case when malfunction information is included in newly collected vehicle information.

According to further embodiments of the present invention, in the case when the power source for vehicle (IG 1) is turned off by a driver when the wireless communications module 290 suitably communicates with a specific AP, the wireless communications controller preferably 283 provides battery power (B+) to the wireless communications module 290 so that the wireless communications module 290 continues to operate. Preferably, the wireless communications module 290 suitably transmits the vehicle information to an AP to which the communications channel is established after connecting a communications channel with an AP under the suitable control of the wireless communications controller 283.

The operation of the wireless telecommunications system for a vehicle according to a preferred embodiment of the present invention is illustrated in detail with reference to the flowchart shown in FIGS. 4 to 5.

Preferably, the wireless communications controller 283 of the MCU 280 suitably periodically receives and collects the vehicle information from the electronic control units 210-270 through the vehicle network (for example, high speed CAN communications). Preferably, in further embodiments, the collected vehicle information is stored in the vehicle information storage unit 281 (S2).

In another related embodiment, at step S4, by using the vehicle information, the wireless communications controller 283 preferably determines whether the driving speed of a corresponding vehicle is suitably lower than a specific speed. In another preferred embodiment of the present invention, it is assumed that the driving speed is suitably lower than 5 Km/h. In still another embodiment of the present invention, preferably only the driving speed is considered, however at step S4, the wireless communications controller 283 may suitably determine the state in which the driving speed is maintained lower than a given speed over a predetermined time (for example, 5 second).

Preferably, according to another exemplary embodiment, as a result of step S4, in the case it is suitably determined that the driving speed of the vehicle is suitably lower than a given speed (e.g., Yes at step S4), it is suitably determined whether the malfunction information is preferably included in the vehicle information (S6).

Preferably, according to another exemplary embodiment, as a result of step S6, in the case it is suitably determined that arbitrary malfunction information transmitted from the electronic control units 210~270 is suitably included in the vehicle information (e.g., Yes at step S6), then the wireless communications controller 283 preferably has the wireless communications module 290 operate normally.

In another embodiment, as a result of step S6, when it is suitably determined that an arbitrary malfunction information transmitted from the electronic control units 210~270 is not suitably included in the vehicle information (e.g., No at step S6), the wireless communications controller 283 suitably inquires the communications record information stored in the communications record information storage unit 282 (S8). Accordingly, in a further related embodiment, it is suitably determined whether a given time elapses from the final AP connection time (S10).

Preferably, as a result of step S10, in an exemplary embodiment where a given time dose not suitably elapse from the final AP connection time (e.g. No at step S10), the wireless communications controller 283 suitably blocks the connection to the AP which is identical with the AP that the vehicle finally connected to or the other AP within a predetermined time. Accordingly, in a further embodiment, the frequent AP connection of the wireless communications module 290 is suitably prevented.

In an exemplary embodiment, for example as shown in FIG. 2, when the vehicle moves from spot A to spot D while driving with a speed which is suitably lower than a given speed, if the state of having transmitted the vehicle information to the AP 1 is suitably confirmed at step S8, as a result of step S10, in a state where a given time has not elapsed after the AP 1 connection, the wireless communications controller 283 has the wireless communications module 290 not operate although the vehicle is suitably connectable with AP 1, AP 2, and AP 3.

As described above, in certain preferred embodiments, although the vehicle enters into AP 2 area (Z2) or AP 3 area (Z3) in the state where the wireless communications module 290 is not normally suitably operating, the wireless communications module 290 does not suitably communicate with AP 2 or AP 3. Accordingly, in preferred embodiments of the invention, a frequent AP connection of the wireless communications module 290 can be suitably prevented.

Preferably, as a result of step S10, when a given time suitably elapses from the final AP connection time (e.g., Yes at step S10), the MCU 280 normally operates the wireless communications module 290(S12). Preferably, the MCU 280 suitably controls a RF (Radio Frequency) output end of the wireless communications module 290 to a normal level so that the wireless communications module 290 sends the vehicle information to the AP detected.

In another preferred embodiment of the present invention, step S4, step S6, and step S10 are sequentially performed. In still another embodiment of the present invention, at least one of step S4, step S6, and step S10 may be selectively performed. Preferably, in reference to step S4, in the case the speed of a vehicle is suitably lower than a given speed, the wireless communications controller 283 may have the wireless communications module 290 preferably operate. In further embodiments of the invention, for example in reference to step S6, in an example where the malfunction information is preferably included in the vehicle information, the wireless communications controller 283 may have the wireless communications module 290 preferably operate. In further embodiments, for example in reference to step S10, in the case a given time elapses from the final AP connection time, the wireless communications controller 283 may have the wireless communications module 290 suitably operate.

Preferably, the wireless communications module 290 which is normally operating at step S12 waits for the reception of a communications inquiry signal (Inquiry) from an arbitrary AP. Then, in related embodiments, in the case the communications inquiry signal is suitably received (e.g., Yes at step S14), the wireless communications module 290 preferably sends a communications inquiry response signal (S16). Preferably, the communications inquiry response signal may include a suitable identifier of the wireless communications module 290. In related embodiments, the wireless communications module 290 waits for the reception of a suitable paging signal (Page) from an AP which sent the communications inquiry signal, and preferably sends the paging response signal when the paging signal is suitably received (e.g., Yes at step S18) (S20).

According to preferred embodiments of the invention, the paging response signal may preferably include a password of the wireless communications module 290. Preferably, in the paging signal, the identifying information of a corresponding AP may be included. In further embodiments, after receiving the paging response signal, the AP performs a suitable authentication of the wireless communications module 290 by using the identifier and the password transmitted from the wireless communications module 290. In another further embodiment, the AP sends a channel setup response signal to the wireless communications module 290 in the case of succeeding in the authentication. Preferably, the channel setup response signal may include a channel number allocated to the wireless communications module 290.

Preferably, after sending the paging response signal (S20), the wireless communications module 290 waits for the reception of the channel setup response signal. Accordingly, in further embodiments, when the channel setup response signal suitably sent from an AP is suitably received (S22), the wireless communications module 290 preferably connects to a wireless channel with an AP based on the channel setup response signal (S24), suitably notifying the communication connecting state to the MCU 280.

According to further preferred embodiments of the invention, the steps of S14 to S24 are preferably procedures for suitably connecting a wireless channel between the wireless communications module 290 and an AP, preferably explained based on Bluetooth communication. In another embodiment of the present invention, a wireless channel setup procedure will be suitably performed according to a corresponding communications protocol when other wireless communications, not including Bluetooth, are applied as suitable wireless communications. Accordingly, in further preferred embodiments, the wireless communications controller 283 of MCU 280 notifies the communications suitably connecting state to the cluster 270. Preferably, after outputting a message for obtaining a communications approval from a driver to a screen (S26), the cluster 270 waits for the communications approval from the driver.

Figure 6:
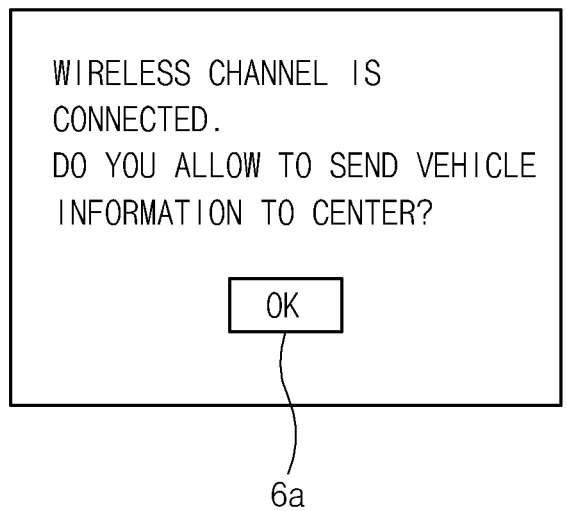
FIG. 6 is a drawing showing an example of an output of an approval asking message for vehicle information that is sent according to an embodiment of the present invention.

In certain exemplary embodiments, for example, as shown in FIG. 6, the message may be "Wireless channel has been connected. Will you send vehicle information?". In an embodiment of the present invention, the message for obtaining the communications approval is suitably outputted through the cluster 270. In other preferred embodiments, the message can be suitably outputted to a display inside vehicle, or a voice message corresponding to the message can be suitably outputted through a speaker inside a vehicle.

In other preferred embodiments, for example in the case of a driver that suitably inputs the communications approval for the message output of step S26 (e.g., Yes at step S28), the wireless communications controller 283 of MCU 280 preferably sends the vehicle information stored in the vehicle information storage 281 to the wireless communications module 290 so that the vehicle information can be sent to the AP by the wireless communications module 290 (S30). Preferably, in the case of approving the wireless transmission of the vehicle information, the driver can suitably indicate his own will, for example by clicking an OK button 6a shown in FIG. 6.

According to other preferred embodiments, the wireless communications module 290 suitably notifies the disconnection of the communications to the MCU 280 when the wireless channel connected to the AP is disconnected due to a radio disturbance, (e.g., Yes at step S32). Preferably, the wireless communications controller 283 of MCU 280 suitably notifies the disconnection of communications to the cluster 270 and suitably displays the state of disconnection on the cluster 270 (S34).

Preferably on the cluster 270, the lamp which suitably displayed status for connecting wireless communications may be turned off according to the cluster's performance, or a text message for guiding the communications disconnection may be suitably outputted.

In other embodiments of the invention, the wireless communications module 290 preferably receives information corresponding to a suitable notice from the AP (S36) when the radio disturbance does not happen (No at step S32). Preferably, the information corresponding to a notice can be information corresponding to contents that the vehicle owner applied in advance, for example, but not limited to, news, stock, news or the like. In related embodiments, the wireless communications module 290 preferably sends the information for the received notice to the MCU 280. Preferably, the wireless communications controller 283 of MCU 280 sends the information of the notice to the cluster 270 and suitably outputs the received notice on the cluster 270 (S38).

Preferably, the wireless communications controller 283 disables the wireless communications module 290 so that the wireless communications module 290 can not suitably respond to any AP during a given time (S40).

According to still further embodiments, the wireless communications controller 283 suitably controls the RF (Radio Frequency) output of the wireless communications module 290 to be lower than a given level so that the communications inquiry response signal which can be outputted from the wireless communications module 290 is not suitably recognized by an AP. Otherwise, the wireless communications controller 283 preferably transits the wireless communications module 290 into a test mode so that the wireless communications module 290 does not normally operate. In further embodiments, the wireless communications controller 283 preferably applies a given control signal to a reset terminal of the wireless communications module 290 so that the wireless communications module 290 does not normally operate.

Figure 4:
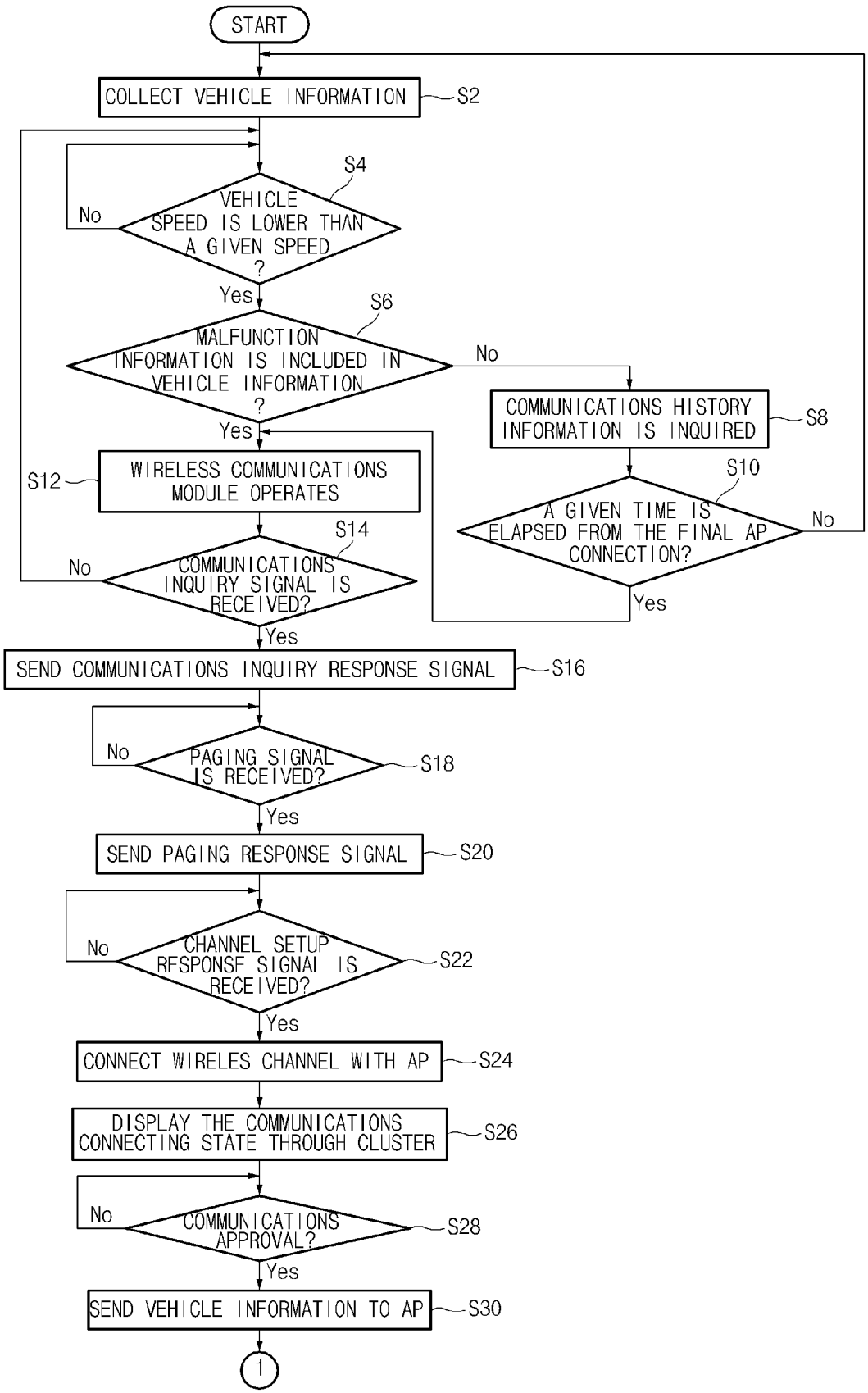
FIGS. 4 and 5 are flowcharts for illustrating a wireless communications method for a vehicle according to an embodiment of the present invention.
Figure 5:
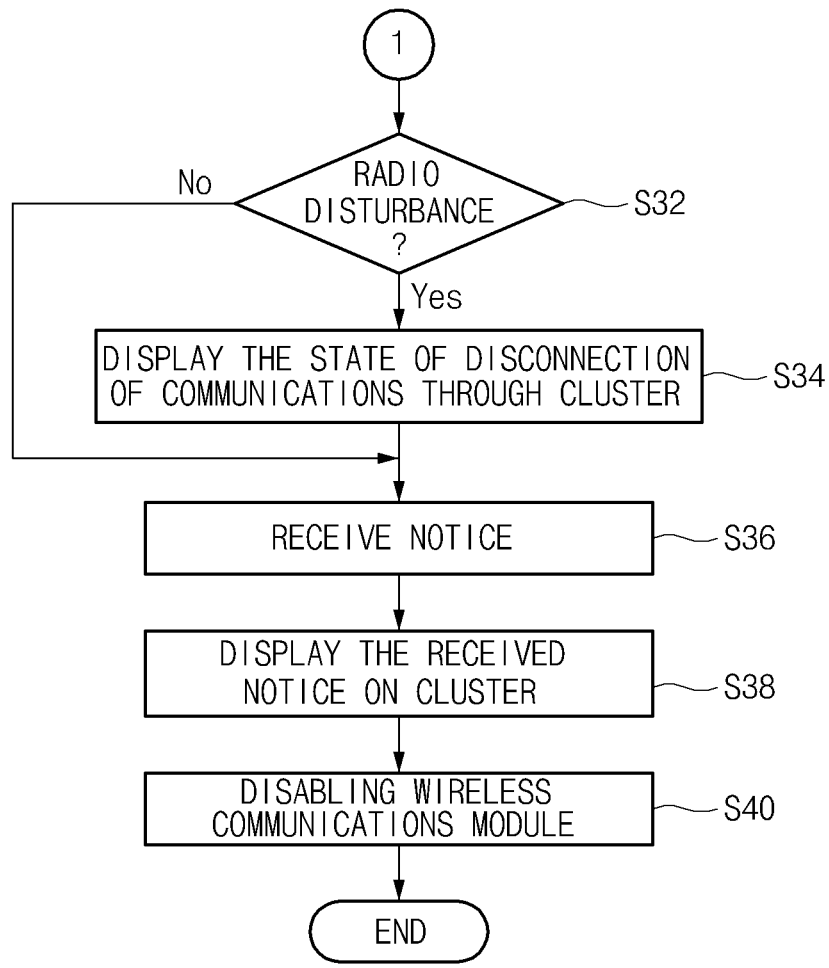

According to further embodiments of the invention, although not shown in FIGS. 4 and 5, when the power source for vehicle (IG 1) is preferably turned off by a driver before the communications of the wireless communications module 290 with an AP is suitably terminated, the wireless communications controller 283 provides battery power to the wireless communications module so that the wireless communications module 290 operates.

As described herein, according to the wireless telecommunications system for a vehicle and method of the present invention, in preferred embodiments a vehicle preferably sends vehicle information to an AP after suitably obtaining the approval of a driver while being connected to an AP so that the personal information can be suitably protected. In further preferred embodiments, the reliability of the vehicle information preferably transmitted to an AP can be suitably improved by connecting the vehicle information to an AP only when the vehicle speed is suitably lower than a given speed. Moreover, according to other preferred embodiments, within a given time after transmitting the vehicle information to a specific AP, the connection with all APs is suitably blocked so that a frequent AP connection of the wireless communications module of a vehicle is preferably blocked.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A wireless telecommunications system for a vehicle, comprising:
a vehicle information storage unit that stores vehicle information collected from each electronic control unit of a vehicle;
a wireless communications module that performs a wireless communications with an AP (Access Point);
a wireless communications controller that connects and disconnects with the AP for wireless communication module by selectively operating the wireless communications module according to a given driving speed of the vehicle, and sends the vehicle information to the AP through the wireless communications module; and
a communications record information storage unit in which the wireless communications record of a vehicle is stored,
wherein the wireless communications controller requests information of the wireless communications record when the speed of the vehicle is less than a given speed, and determines whether to block the connection to an other AP or allow the wireless communications module to operate normally, depending on whether a predetermined time has elapsed after a final connection with the AP, using the information of the wireless communications record.

2. The wireless telecommunications system for vehicle of claim 1, wherein the wireless communications controller blocks the connection to the other AP when a given time does not elapse after a final connection with the AP, and normally operates the wireless communications module once a given time elapses after a final connection with the AP.

3. The wireless telecommunications system for vehicle of claim 1, wherein the wireless communications controller requests information from the wireless communications record, and normally operating the wireless communications module once a given time elapses after the final connection with the AP.

4. The wireless telecommunications system for vehicle of claim 1, wherein the wireless communications controller sends the vehicle information to the wireless communications module when a sending of the vehicle information is approved from a driver.

5. The wireless telecommunications system for vehicle of claim 4, wherein the wireless communications controller outputs a message which asks the driver a communications approval through a display.

6. The wireless telecommunications system for vehicle of claim 4, wherein the wireless communications controller outputs a message which asks the driver a communications approval through a speaker.

7. The wireless telecommunications system for vehicle of claim 4, wherein the wireless communications controller receives a communications approval confirmation command from a display.

8. The wireless telecommunications system for a vehicle of claim 1, wherein the wireless communications controller normally operates the wireless communications module although a given time does not pass after the wireless communication module lastly communicates with a AP when malfunction information transmitted from a specific electronic control unit is included in the vehicle information.

9. The wireless telecommunications system for a vehicle of claim 1, wherein the wireless communications controller normally operates the wireless communications module by providing battery power to the wireless communications module, when a power source for a vehicle is turned off before the communications of the wireless communications module with the AP is terminated.

10. A wireless communications method for vehicle, comprising the steps of:
   (a) collecting vehicle information from one or more electronic control units of a vehicle
   (b) connecting or disconnecting the wireless communications module with an AP by selectively operating the wireless communications module of the vehicle according to a given driving speed of the vehicle; and
   (c) sending the vehicle information to the AP through the wireless communications module,
   wherein step (b) comprises operating the wireless communications module when the vehicle speed is less than a given speed so that the wireless communications module communicates with the AP, requesting information from the wireless communications record when the speed of the vehicle is lower than a given speed, and determine whether to block the connection to an other AP or normally operate the wireless communications module, depending on whether a predetermined time has elapsed after a final connection with the AP, using the information from the wireless communications record.

11. The wireless telecommunications method for vehicle of claim 10, wherein step (b) comprises operating the wireless communications module if a given time elapses after a final AP connection of the vehicle so that the wireless communications module communicates with the AP.

12. The wireless telecommunications method for vehicle of claim 10, wherein the step (b) comprises operating the wireless communications module if malfunction information transmitted from a specific electronic control unit is included in the vehicle information so that the wireless communications module communicates with the AP.

13. The wireless telecommunications method for vehicle of claim 10, wherein step (c) further comprises obtaining an approval for sending the vehicle information from a driver of the vehicle.

14. The wireless telecommunications method for vehicle of claim 13, wherein step (c) further comprises outputting a message which inquires the approval for sending the vehicle information of the driver through a display or a speaker.

15. The wireless telecommunications method for vehicle of claim 10, further comprising providing battery power to the wireless communications module, in the case a power source for a vehicle is turned off while the wireless communications module of the vehicle communicates with the AP.

16. The wireless telecommunications method for vehicle of claim 15, further comprising transiting to a state where the wireless communications module cannot communicate with an arbitrary AP when the communications of the wireless communications module of the vehicle with the AP is completed.

17. The wireless telecommunications method for vehicle of claim 10, further comprising transiting to a state where the wireless communications module cannot communicate with an arbitrary AP when the communications of the wireless communications module of the vehicle with the AP is finished.

* * * * *